(12) United States Patent
Ding et al.

(10) Patent No.: US 9,495,043 B2
(45) Date of Patent: Nov. 15, 2016

(54) TOUCH PANEL AND OPERATION METHOD THEREOF

(75) Inventors: Hua Ding, Xiamen (CN); Silu Yu, Fuzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 131 days.

(21) Appl. No.: 13/409,049

(22) Filed: Feb. 29, 2012

(65) Prior Publication Data

US 2013/0027291 A1    Jan. 31, 2013

(30) Foreign Application Priority Data

Jul. 28, 2011   (CN) .......................... 2011 1 0225224

(51) Int. Cl.
*G09G 5/00*     (2006.01)
*G06F 3/044*    (2006.01)
*G06F 3/045*    (2006.01)

(52) U.S. Cl.
CPC .............. *G06F 3/044* (2013.01); *G06F 3/045* (2013.01)

(58) Field of Classification Search
None
See application file for complete search history.

(56) References Cited

U.S. PATENT DOCUMENTS 6,323,846 B1 * 11/2001 Westerman ........... G06F 3/0235
345/173
6,392,636 B1 * 5/2002 Ferrari ................ G06F 3/03547
345/157
8,368,661 B2 * 2/2013 Chang ................... G06F 3/044
345/173
2002/0156593 A1 * 10/2002 Hayes ................. G06K 9/0002
702/127
2008/0042994 A1 * 2/2008 Gillespie ............. G06F 3/03547
345/174
2008/0158198 A1 * 7/2008 Elias ..................... G06F 3/044
345/174
2010/0007628 A1 * 1/2010 Eriguchi ................ G06F 3/045
345/174

(Continued)

FOREIGN PATENT DOCUMENTS

CN          1185844 A     6/1998
JP         2010020443     1/2010

(Continued)

*Primary Examiner* — Seokyun Moon
*Assistant Examiner* — Douglas M Wilson
(74) *Attorney, Agent, or Firm* — Cooper Legal Group, LLC (57) ABSTRACT

The present invention relates to a touch panel. The touch panel includes a substrate, a plurality of first traces, a plurality of second traces, and a plurality of sensing pads. The first traces are disposed on the substrate and are parallel to each other along a first direction. The second traces are disposed on the substrate and are parallel to each other along a second direction. The first traces and the second traces interlace with each other to form a plurality of sensing pad areas. Each sensing pad is disposed in each sensing pad area, and is electrically connected to each first trace and each second trace. The present invention further provides a method of operating the same. In the present invention, the thickness of the touch panel is decreased, and the material for the electrodes is economized. Consequently, the costs of the touch panel can be reduced.

20 Claims, 5 Drawing Sheets

(56) References Cited

U.S. PATENT DOCUMENTS

| | | | |
|---|---|---|---|
| 2010/0182250 A1* | 7/2010 | Kang | G06F 3/0416 345/173 |
| 2011/0006999 A1* | 1/2011 | Chang | G06F 3/044 345/173 |
| 2011/0181519 A1* | 7/2011 | Tsai | G06F 3/0412 345/173 |
| 2012/0044192 A1* | 2/2012 | Hsu | G06F 3/044 345/174 |
| 2012/0235969 A1* | 9/2012 | Burns | B81C 1/00095 345/211 |

FOREIGN PATENT DOCUMENTS

| | | |
|---|---|---|
| JP | 2010541109 A | 12/2010 |
| KR | 1002771470000 | 1/2001 |
| TW | 201108074 A1 | 3/2011 |

\* cited by examiner

TOUCH PANEL AND OPERATION METHOD THEREOF

This application claims the benefit of China application No. 201110225224.9, filed on Jul. 28, 2011.

BACKGROUND OF THE INVENTION

1. Field of the Invention

The present invention relates to a touch panel, and more particularly, to a touch panel with a novel electrode structure.

2. Description of the Prior Art

Currently, in the market of various kinds of consumer electronic products, touch panels have been widely applied to portable electronic devices such as personal digital assistants (PDA), mobile phones, notebooks, and even in personal computers and digital home appliances for serving as the interface of an information communication tool between the users and the electronic devices. When using the touch panel, the user can directly operate and send out a command through the objects displayed on the panel, thus providing a more user-friendly interface. With the pursuit of electronic products of compact size in the market, touch panel has gradually replaced conventional input apparatuses such as operation buttons, keyboards, and mouse in order to save space. Accordingly, the display device with a touch panel has become the key component of various electronic products.

Figure 1:
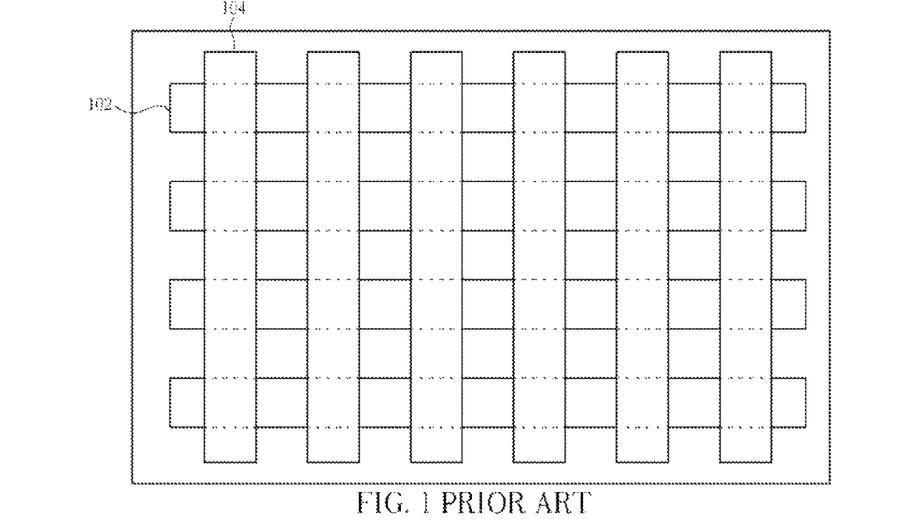
FIG. 1 illustrates a schematic diagram of a conventional touch panel.

FIG. 1 illustrates a schematic diagram of a conventional touch panel. As shown in FIG. 1, the touch function of a conventional touch panel 100 is mainly provided by a plurality of horizontal electrodes 102 and a plurality of vertical electrodes 104. As the electrodes 102 and 104 stretch along two axes, the horizontal position and the vertical position can be sensed respectively, and the touch position can therefore be determined. In general, two different layers of conductive materials form the horizontal electrodes 102 and the vertical electrodes 104. If an insulation layer is further placed between the two electrode layers, at least three to four layers of stacking are required in the touch panel 100. The size of the touch panel is therefore hard to be smaller, and the manufacturing method may be complicated. Consequently, current manufacturers, so as to meet the trends of lightness and small size, study various types of touch panels with less layer stacking.

SUMMARY OF THE INVENTION

The present invention therefore provides a touch panel with a novel electrode structure, which is able to reduce the stacking layers of the touch panel.

According to one embodiment of the present invention, the touch panel includes a substrate, a plurality of first traces, a plurality of second traces, and a plurality of sensing pads. The first traces are disposed on the substrate and are parallel to each other along a first direction. The second traces are disposed on the substrate and are parallel to each other along a second direction. The first traces and the second traces interlace with each other to form a plurality of sensing pad areas. Each sensing pad is disposed in each sensing pad area and is electrically connected to each first trace and each second trace.

According to another embodiment of the present invention, an operation method of a touch panel is provided. In the operation method, a first time mode is performed, such that the first traces have a sensing signal and the second traces do not have a sensing signal. A second time mode is performed such that the second traces have a sensing signal and the first traces do not have a sensing signal. The sensing pads can detect the touch position along the first direction by the second traces.

Since the touch panel in the present invention provides a novel electrode structure, only one layer of sensing electrode (the sensing pad) is required in the touch panel. In comparison with conventional arts, which require at least two layers of sensing electrode, the thickness of the touch panel can be reduced.

These and other objectives of the present invention will, become obvious to those of ordinary skill in the art after reading the following a detailed description of the preferred embodiment that is illustrated in the various figures and drawings.

DETAILED DESCRIPTION

For those skilled in the art to understand this invention, numerous embodiments are described below, annexing drawings to minutely illustrate the matters of the invention and the purpose thereof.

Figure 2:
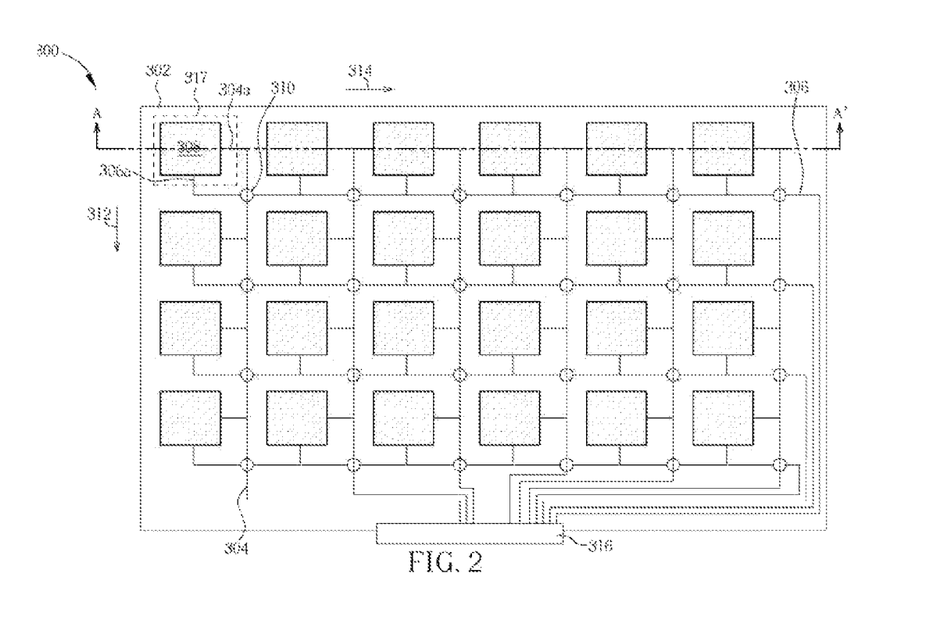
FIG. 2 illustrates a schematic diagram of the touch panel according to the first embodiment in the present invention.

FIG. 2, illustrates a schematic diagram of the touch panel according to the first embodiment in the present invention. As shown in FIG. 2, the touch panel 300 in the present embodiment includes a substrate 302 in which a plurality of first traces 304, a plurality of second traces 306, a plurality of sensing pads 308, and a plurality of insulation mounds 310 are disposed on the substrate 302. In the present embodiment, the first traces 304, the second traces 306, the sensing pads 308, and the insulation mound 310 are disposed on the same side of the substrate 302. In one embodiment, the substrate 302 may be any flexible transparent substrate or any rigid transparent substrate, such as a glass substrate, a plastic substrate, or a quartz substrate.

As shown in FIG. 2, the first traces 304 are parallel to each other and stretch along a first direction 312, and the second traces 306 are parallel to each other and stretch along a second direction 314. In one embodiment, the first direction 312 is substantially perpendicular to the second direction 314. The first traces 304 and the second traces 306 interlace with each other to form a plurality of sensing pad areas 317, in which a sensing pad 308 is disposed therein. The shape of the sensing pad 308 may by a rectangle, a circle, or other geometric shapes. In one preferred embodiment, the sensing pad 308 is square, which may have the greatest area usage. As shown in FIG. 2, each sensing pad 308 is electrically connected to one first trace 304 and one second trace 306. Specifically, each sensing pad 308 is electrically connected to one first trace 304 via a first auxiliary trace 304a, and is also connected to one second trace 306 via a second auxiliary trace 306a. In one embodiment, the first auxiliary traces 304a are substantially parallel to the second direction 314, and the second auxiliary traces 306a are substantially parallel to the first direction 312.

In one preferred embodiment of the present invention, the first traces 304, the first auxiliary traces 304a, the second traces 306, and the second auxiliary traces 306a are formed by one manufacturing step and are made of the same materials, such as gold, silver, copper, aluminum, molybdenum, titanium, tantalum, cadmium, or nitride thereof, or oxide thereof, or alloy thereof, or the combination thereof, but is not limited thereto. In another embodiment, the first traces 304 and the second traces 306 may include transparent conductive materials. The sensing pad 308 may be made of one single material or of composite materials, including indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMgO), or indium gallium aluminum oxide (InGaAlO), but is not limited thereto.

As shown in FIG. 2, the insulation mound 310 is disposed at the intersection of the first traces 304 and the second traces 306 thereto insulate the first traces 304 and the second traces 306 on the same side of the substrate 302. In one embodiment, the first traces 304 straddle on the insulation mounds 310 while the second traces 306 are under the insulation mounds 310. In another embodiment, the second traces 306 straddle on the insulation mound 310 while the first traces 304 are under the insulation mound 310. The insulation mound 310 may be made of various insulation materials such as silicon oxide ($SiO_2$), silicon nitride (SiN), silicon nitridecarbide (SiCN), silicon carbide (SiC), or the combination thereof, but is not limited thereto. As shown in FIG. 2, the first traces 304 and the second traces 306 are connected to a driving chip 316, which is able to provide driving signals to carry out the touch sensing function.

Figure 3:
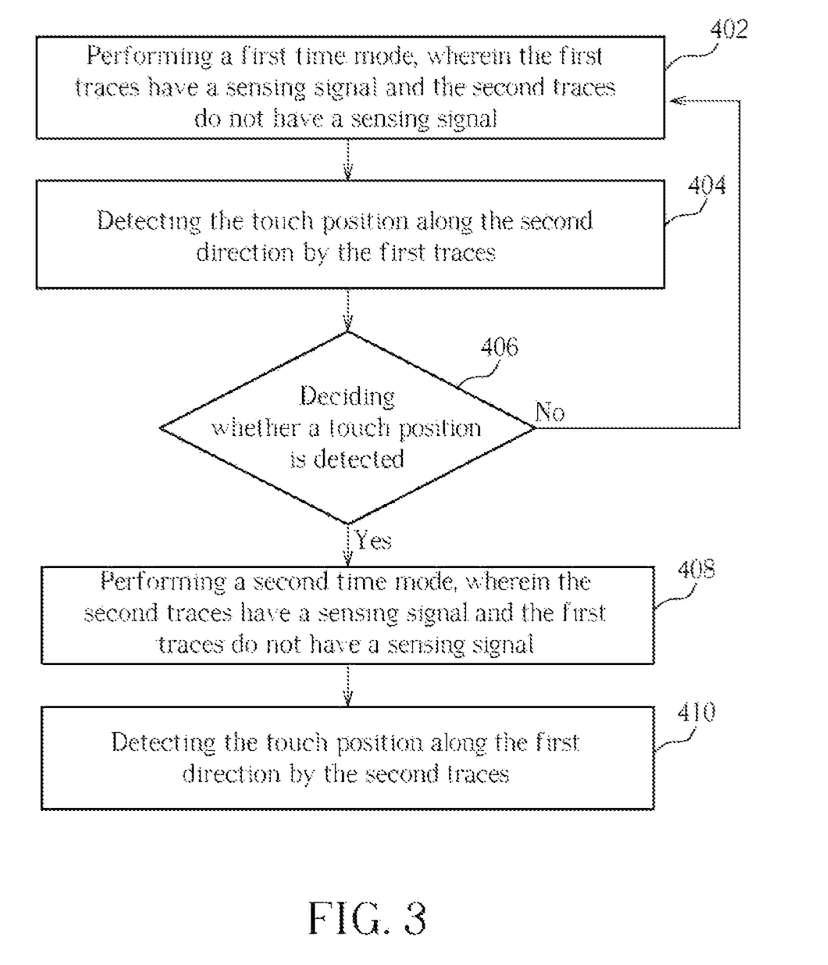
FIG. 3 illustrates a flow chart of the operation method of the touch panel in the present invention.

When operating the touch panel 300 in the present invention, the sensing signals are supplied respectively to the first traces 304 and the second traces 306 within different time intervals. FIG. 3 illustrates a flow chart of the operation method of the touch panel in the present invention. As shown in FIG. 3 in conjunction with FIG. 2, in a first time mode, a sensing signal is supplied to the first traces 304 by the driving chip 316, while no sensing signal is supplied to the second traces 306 (step 402). At this time, the sensing pads 308 can sense the touch position along the second direction 314, through the first traces 304 (step 404). Next, the driving chip 316 will decide whether the sensing pad 308 (step 406) detected the touch position, if yes, further proceed to step 408, if not, return to step 402. Next, in a second time mode, a sensing signal is supplied to the second traces 306 by the driving chip 316 while no sensing signal is supplied to the first traces 304 (step 408). At this time, the sensing pads 308 can sense the touch position along the first direction 312, through the second traces 306 (step 410). By alternatively performing the first time mode and the second time mode, the sensing pads 308 can therefore be "shared" by the first traces 304 and the second traces 306. Consequently, the driving chip 316 can determine the touch position along the first direction 312 and the second direction 314. It is understood that the above embodiment is to give the sensing signals to the first traces 304 in the first time mode and then chronologically to the second traces 306 in the second time mode. In another embodiment, it is available to give the sensing signals to the second traces 306 in the first time mode, and then to the first traces 304 in the second tune mode.

Figure 4:
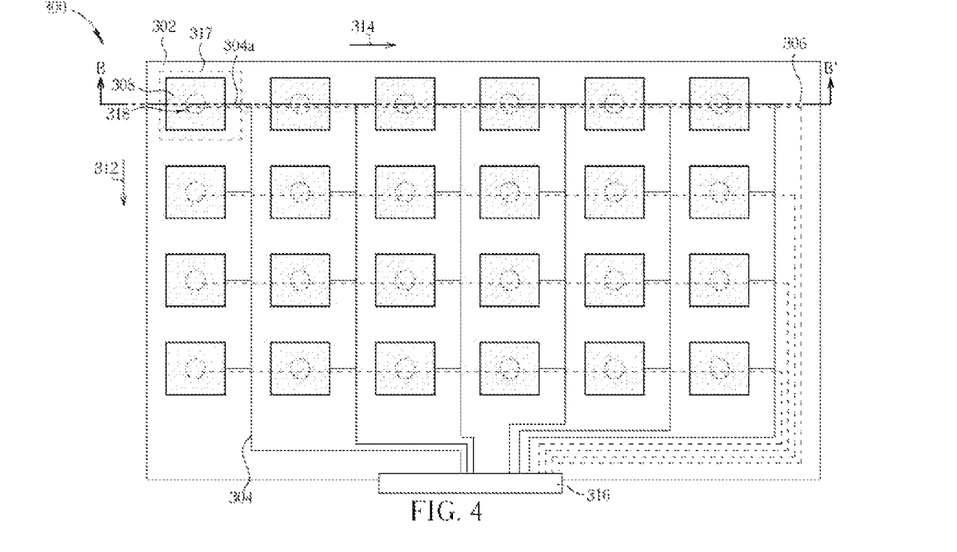
FIG. 4 and FIG. 5 illustrate schematic diagrams of the touch panel according to the second embodiment in the present invention.
Figure 5:
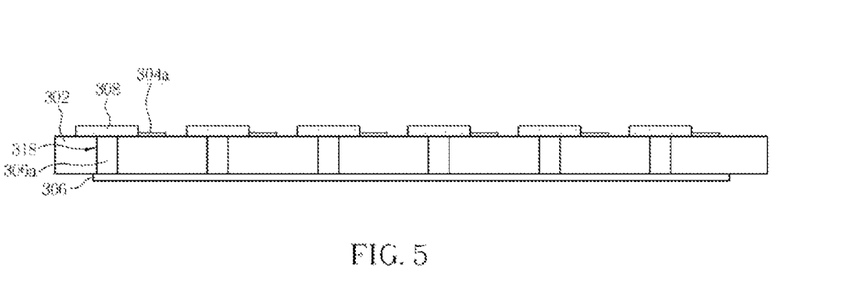

FIG. 4 and FIG. 5 illustrate schematic diagrams of the touch panel according to the second embodiment in the present invention, wherein FIG. 5 is a cross-sectional view of FIG. 4 taken along line BB'. As shown in FIG. 4 and FIG. 5, the main difference between the second embodiment and the first embodiment lies in that the first traces 304 and the second traces 306 are disposed on two corresponding sides of the substrate 302. That is, the first traces 304 and the sensing pads 308 are disposed on one side of the substrate 302, and the second traces 306 are disposed on the other side of the substrate 302. In the present embodiment, the second traces 306 may include metal or a transparent conductive material. As shown in FIG. 5, pluralities of contact holes 318 are disposed in the substrate 302. In one preferred embodiment, the contact holes 318 are located correspondingly under the sensing pads 308, and the second auxiliary traces 306a are disposed in the contact holes 318. Each sensing pad 308 is electrically connected to each second trace 306 via each second auxiliary trace 306a. This way, the touch sensing function of the touch panel 300 can also be performed by alternatively processing the first time mode and the second time mode. It is noted that, since the first traces 304 and the second traces 306 are disposed on different sides of the substrate 302, the insulation mounds 308 are not required in the present embodiment.

Figure 6:
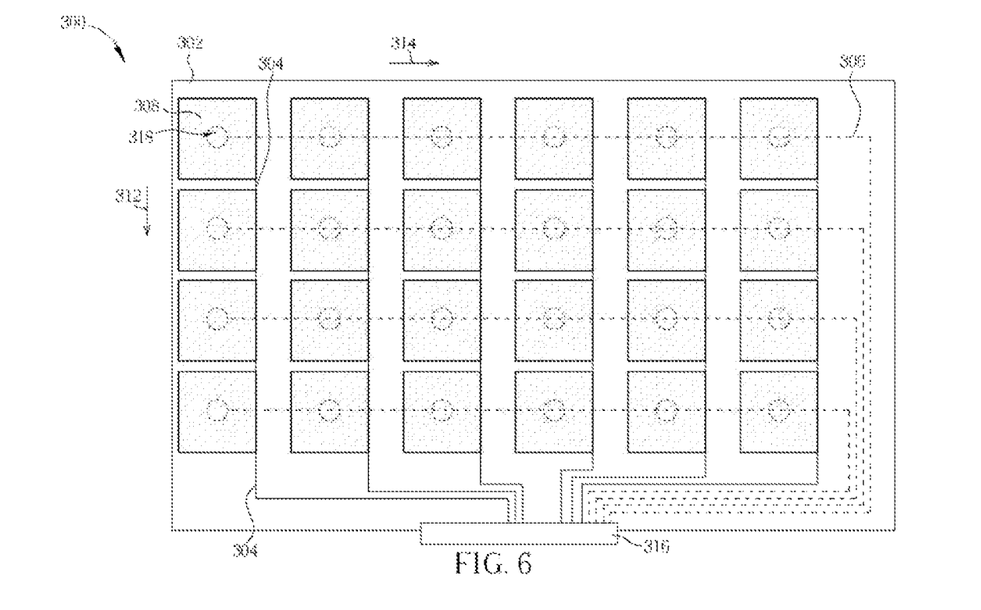
FIG. 6 illustrates a schematic diagram of the touch panel according to another embodiment in the present invention.

In another embodiment, the first auxiliary traces 304a can even be omitted. FIG. 6 illustrates a schematic diagram of the touch panel according to another embodiment in the present invention. As shown in FIG. 6, in the touch panel 300 of the present embodiment, there can be no first auxiliary traces 304a between the first traces 304 and the sensing pads 308. The sensing pads 308 are directly connected to the first traces 304. In the present embodiment, since the arrangement of the second traces 306 is not considered, because they are disposed on the other side of the substrate 302, the size of the sensing pad 308 can be enlarged as compared to the first embodiment, thereby enhancing the sensitivity of the touch panel 300.

Figure 7:
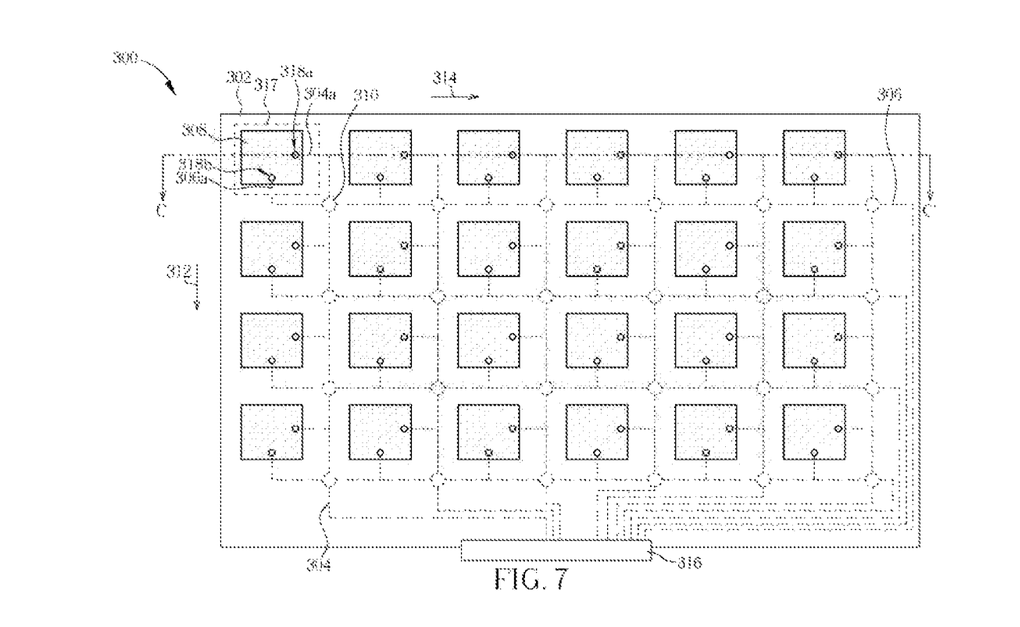
FIG. 7 and FIG. 8 illustrate schematic diagrams of the touch panel according to the third embodiment of the present invention.
Figure 8:
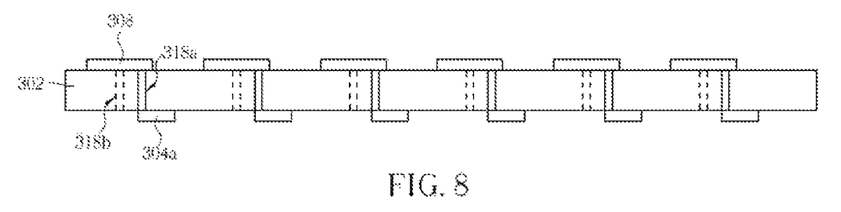

FIG. 7 and FIG. 8 illustrate schematic diagrams of the touch panel according to the third embodiment of the present invention, wherein FIG. 8 is a cross-sectional view of FIG. 7 taken along line CC'. As shown in FIG. 7 and FIG. 8, the main difference between the third embodiment and the first embodiment lies in that the first traces 304 and the second traces 306 are disposed on one side of the substrate 302, and the sensing pads 308 are disposed on the other side of the substrate 302. As shown in FIG. 7, a plurality of first contact holes 318a and a plurality of second contact holes 318b are disposed in the substrate 302, and more preferably, both of which are located correspondingly under the sensing pad 308. Each sensing pad 308 is electrically connected to each first trace 306 via each first auxiliary trace 306a in the first contact hole 318a and is also electrically connected to each second trace 306 via each second auxiliary trace 306a in the second contact hole 318b. The insulation mounds 310 are disposed on the same side of the substrate 302 with respect to the first traces 304 and the second traces 306, and are located between the first traces 304 and the second traces 306. The touch sensing function of the touch panel 300 can also be carried out by alternatively processing the first time mode and the second time mode as well. It is one advantage of the present embodiment that, the sensing pads 308 include transparent conductive material, while the first traces 304 and the second traces 306 include metals. Since the sensing pads 308 and the first traces 304, and the second traces 306 are disposed on two respective sides of the substrate 302, the fabrication methods thereof would not be affected by each other and can be easier to operate. Consequently, the yields of the product can be increased.

Figure 9:
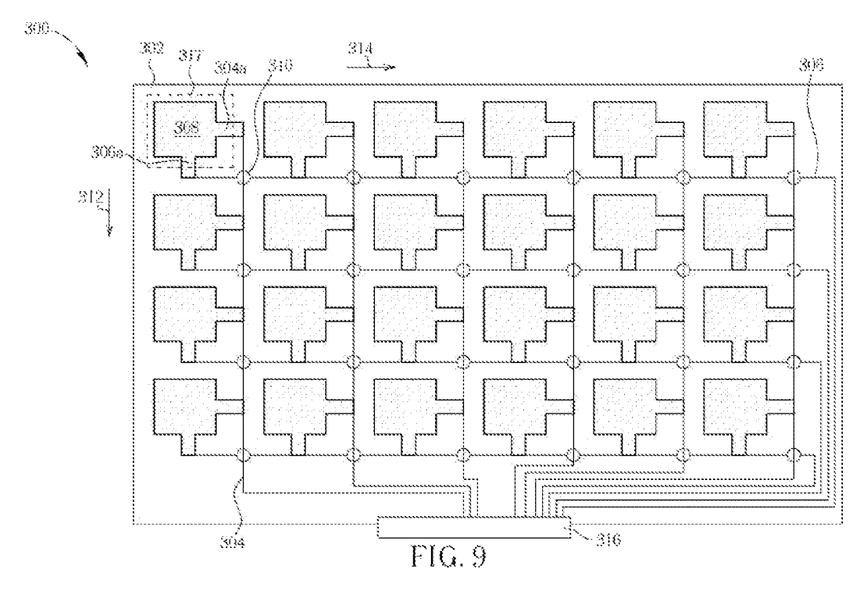
FIG. 9 illustrates a schematic diagram of the touch panel according to the fourth embodiment in the present invention.

FIG. 9 illustrates a schematic diagram of the touch panel according to the fourth embodiment in the present invention. As shown in FIG. 9, the main difference between the fourth embodiment and the first embodiment lies in that the first auxiliary traces 304a and the second auxiliary traces 306a are made of the same material as the sensing pads 308, such as a transparent conductive material. That is, the first auxiliary traces 304a, the second auxiliary traces 306a, and the sensing pads 308 are formed by one same fabrication step such that the first auxiliary traces 304a, the second auxiliary traces 306a, and the sensing pads 308 are monolithic. It is noted that the fourth embodiment can be incorporated with the first embodiment, the second embodiment, and the third embodiment arbitrarily. For instance, the first auxiliary traces 304a in FIG. 4 can be made of transparent conductive materials. For the sake of simplicity, the detailed descriptions of the overall combinations of arrangement are omitted.

Figure 10:
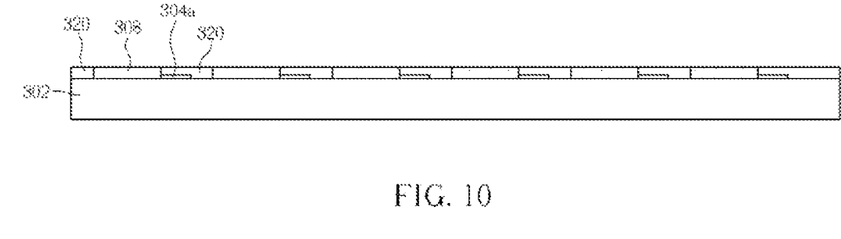
FIG. 10 illustrates a schematic diagram of the touch panel according to the fifth embodiment of the present invention.

Moreover, FIG. 10, illustrates a schematic diagram of the touch panel according to the fifth embodiment of the present invention, wherein FIG. 10 is a cross-sectional view of FIG. 2 taken along line AA'. As shown in FIG. 10, in order to prevent the phenomenon of parasitic capacitance, which is formed due to a small distance between each sensing pad 308 (especially for the sensing pads 308 with larger size in FIG. 6), an insulation layer 320 is disposed between each sensing pad 308 on the substrate 302. The insulation layer 320 is filled into gaps between each sensing pad 308, and more preferably, the insulation layer 320 is level with a top surface of the sensing pads 308. However, the insulation layer 320 can be higher than the top surface of the sensing pads 308. The insulation layer 320 can be made of any insulation materials. In one preferred embodiment, the insulation layer 320 uses the material that has an index of refraction close to that of the sensing pads 308. For example, when the sensing pads 308 include ITO, the insulation layer 320 can be $TiO_2$ or $ZrO_2$. Similarly, the fifth embodiment can be incorporated with the first embodiment, the second embodiment, the third embodiment, and the fourth embodiment arbitrarily and the detailed descriptions of the overall combinations of arrangement are omitted.

It is understood that the touch sensing function of the touch panel 300 is carried out by the "array" of the plurality of sensing pads 308. However, the way of sensing the touch position is not limited to capacitor type touch sensing, but can also be other types of sensing ways, such as resistive type sensing. For example, when constructing the resistive type sensing touch panel, a planer electrode can be disposed correspondingly above the sensing pad 308. When an external force is applied on the touch panel to make the planer electrode electrically connected to the sensing pad 308, the sensing pad 308 can also detect the touch position. It is understood the abovementioned embodiment should belong to the claimed invention.

In summary, the present invention provides a touch panel, which is operated by supplying a sensing signal respectively to the first traces and the second traces at different time intervals. As a result, the touch position along the first direction and the second direction can be determined. Since the present invention provides the novel electrode structure, only one stack layer of sensing electrode (the sensing pad) is required in the touch panel. In comparison with conventional arts, which require at least two layers of sensing electrode, the volume of the touch panel in the present invention can be reduced.

Those skilled in the art will readily observe that numerous modifications and alterations of the device and method may be made while retaining the teachings of the invention.

What is claimed is:

1. A touch panel, comprising:
   a substrate, wherein the substrate has a first surface and a second surface opposite to the first surface;
   a plurality of first traces parallel to each other along a first direction;
   a plurality of second traces parallel to each other along a second direction, wherein the first traces and the second traces are disposed on the first surface of the substrate; and
   a plurality of sensing pads disposed on the second surface of the substrate, wherein each sensing pad is a single layer electrode, and wherein each sensing pad is electrically connected to one of the first traces through a first conducting path and electrically connected to one of the second traces through a second conducting path, wherein the first conducting path and the second conducting path are located under the corresponding sensing pad;
   wherein the first conducting path comprises a first auxiliary trace and a first contact hole and the second conducting path comprises a second contact hole, wherein the first contact hole and the second contact hole are covered by the corresponding sensing pad, the first auxiliary trace is connected between the first contact hole and the corresponding first trace.

2. The touch panel according to claim 1, further comprising a driving chip connected to the first traces and the second traces, wherein the driving chip supplies a sensing signal to the first traces in a first time mode, and wherein the driving chip supplies the sensing signal to the second traces in a second time mode.

3. The touch panel according to claim 1, further comprising a plurality of insulation mounds disposed at each intersection of the first traces and the second traces.

4. The touch panel according to claim 1, wherein the second conducting path further comprises a second auxiliary trace, and the second auxiliary trace is connected between the second contact hole and the corresponding second trace.

5. A touch panel, comprising:
   a substrate, wherein the substrate has a first surface and a second surface opposite to the first surface;
   a plurality of first traces and a plurality of second traces, wherein the first traces are disposed on the first surface of the substrate and parallel to each other along a first direction and the second traces are disposed on the second surface of the substrate and parallel to each other along a second direction; and
   a plurality of sensing pads disposed on the first surface of the substrate, wherein each sensing pad is a single layer electrode, and each sensing pad is electrically connected to a corresponding one of the first traces through a first conducting path, and wherein each sensing pad is electrically connected to a corresponding one of the second traces through a second conducting path;

wherein the first conducting path comprises a first auxiliary trace and the second conducting path comprises a contact hole, wherein the contact hole is covered by the corresponding sensing pad.

6. The touch panel according to claim 5, further comprising a driving chip connected to the first traces and the second traces, wherein the driving chip supplies a sensing signal to the first traces in a first time mode, and wherein the driving chip supplies the sensing signal to the second traces in a second time mode.

7. The touch panel according to claim 5, wherein the second conducting path further comprises a second auxiliary trace, and the second auxiliary trace is connected between the contact hole and the corresponding second trace.

8. The touch panel according to claim 7, wherein the first auxiliary trace is a branch portion extending from the corresponding sensing pad.

9. The touch panel according to claim 5, wherein the first auxiliary trace is a branch portion extending from the corresponding sensing pad.

10. A touch panel, comprising:
a substrate, wherein the substrate has a first surface and a second surface opposite to the first surface;
a plurality of first traces and a plurality of second traces, wherein the first traces are disposed on the first surface of the substrate and parallel to each other along a first direction and the second traces are disposed on the second surface of the substrate and parallel to each other along a second direction; and
a plurality of sensing pads disposed on the first surface of the substrate, wherein each sensing pad is a single layer electrode, and each sensing pad is electrically connected to a corresponding one of the first traces through a first conducting path, and wherein each sensing pad is electrically connected to a corresponding one of the second traces through a second conducting path;
wherein each sensing pad makes contact with the corresponding first trace to form the first conducting path, and wherein the second conducting path comprises a contact hole, and wherein the contact hole is covered by the corresponding sensing pad.

11. The touch panel according to claim 10, wherein the second conducting path further comprises an auxiliary trace, and the auxiliary trace is connected between the contact hole and the corresponding second trace.

12. The touch panel according to claim 1, further comprising an insulation layer disposed on the substrate and located between each two adjacent sensing pads, and a top surface of each sensing pad is exposed from the insulation layer.

13. The touch panel according to claim 12, wherein the insulation layer comprises at least one of $TiO_2$ or $Zro_2$.

14. The touch panel according to claim 5, further comprising an insulation layer disposed on the substrate and located between each two adjacent sensing pads, and a top surface of each sensing pad is exposed from the insulation layer.

15. The touch panel according to claim 14, wherein the insulation layer comprises at least one of $TiO_2$ or $Zro_2$.

16. A touch panel, comprising:
a substrate, wherein the substrate has a first surface and a second surface opposite to the first surface;
a plurality of first traces and a plurality of second traces, wherein the first traces are disposed on the first surface of the substrate and parallel to each other along a first direction and the second traces are disposed on the second surface of the substrate and parallel to each other along a second direction; and
a plurality of sensing pads disposed on the first surface of the substrate, wherein each sensing pad is a single layer electrode, and each sensing pad is electrically connected to a corresponding one of the first traces through a first conducting path, and wherein each sensing pad is electrically connected to a corresponding one of the second traces through a second conducting path;
wherein the second conducting path is covered by the corresponding sensing pad.

17. The touch panel according to claim 10, further comprising an insulation layer disposed on the substrate and located between each two adjacent sensing pads, and a top surface of each sensing pad is exposed from the insulation layer.

18. The touch panel according to claim 17, wherein the insulation layer comprises at least one of $TiO_2$ or $Zro_2$.

19. The touch panel according to claim 16, further comprising an insulation layer disposed on the substrate and located between each two adjacent sensing pads, and a top surface of each sensing pad is exposed from the insulation layer.

20. The touch panel according to claim 19, wherein the insulation layer comprises at least one of $TiO_2$ or $Zro_2$.

* * * * *